US012524661B2

(12) United States Patent
Song et al.

(10) Patent No.: US 12,524,661 B2
(45) Date of Patent: Jan. 13, 2026

(54) SEMICONDUCTOR DEVICES OF OPTICAL NEURAL NETWORK AND METHODS OF FORMING THE SAME

(71) Applicant: Taiwan Semiconductor Manufacturing Company, Ltd., Hsinchu (TW)

(72) Inventors: Weiwei Song, San Jose, CA (US); Stefan Rusu, Sunnyvale, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 845 days.

(21) Appl. No.: 17/844,192

(22) Filed: Jun. 20, 2022

(65) Prior Publication Data
US 2023/0409894 A1    Dec. 21, 2023

(51) Int. Cl.
*G06N 3/06* (2006.01)
*G06N 3/067* (2006.01)

(52) U.S. Cl.
CPC .................................. *G06N 3/067* (2013.01)

(58) Field of Classification Search
CPC ...................................................... G06N 3/067
See application file for complete search history.

(56) References Cited

U.S. PATENT DOCUMENTS

| | | | | |
|---|---|---|---|---|
| 12,287,842 B2* | 4/2025 | Roques-Carmes | .... | G06N 3/044 |
| 2008/0212975 A1* | 9/2008 | Burenkov | ............ | G02B 6/1226 |
| | | | | 398/140 |
| 2012/0107999 A1* | 5/2012 | Fan | ....... | A61N 1/0543 |
| | | | | 257/E31.124 |
| 2012/0109295 A1* | 5/2012 | Fan | ....... | A61N 1/0543 |
| | | | | 623/6.63 |
| 2021/0116637 A1 | 4/2021 | Li et al. | | |
| 2021/0336050 A1* | 10/2021 | Mattis | ................... | G02F 1/0121 |
| 2022/0012576 A1* | 1/2022 | Choi | ...................... | H10D 64/64 |
| 2022/0045757 A1* | 2/2022 | Pleros | ................ | H04Q 11/0005 |
| 2022/0180163 A1* | 6/2022 | Lamb | ....................... | G06N 3/067 |
| 2023/0306253 A1* | 9/2023 | Dobos | ..................... | G06N 3/067 |
| 2023/0409894 A1* | 12/2023 | Song | ...................... | G06N 3/067 |

FOREIGN PATENT DOCUMENTS

| TW | 202109865 A | 3/2021 |
|---|---|---|
| TW | 202213710 A | 4/2022 |
| TW | 202221578 A | 6/2022 |

OTHER PUBLICATIONS

Office Action issued in connection with Taiwan Appl. No. 112100753 dated Sep. 12, 2023.

* cited by examiner

*Primary Examiner* — Eliyah S. Harper
(74) *Attorney, Agent, or Firm* — FOLEY & LARDNER LLP

(57) ABSTRACT

A semiconductor device includes an oxide layer having a first side and a second side opposite to each other. The semiconductor device includes a plurality of first waveguides that are disposed across a plurality of first insulator layers, respectively, on the first side of the oxide layer. The semiconductor device includes a plurality of second waveguides that are disposed across a plurality of second insulator layers, respectively, on the second side of the oxide layer. The plurality of first waveguides and the plurality of second waveguides collectively form a plurality of photonic neural network layers of an artificial neural network.

20 Claims, 15 Drawing Sheets

SEMICONDUCTOR DEVICES OF OPTICAL NEURAL NETWORK AND METHODS OF FORMING THE SAME

BACKGROUND

The semiconductor industry has experienced rapid growth due to continuous improvements in the integration density of a variety of electronic components. Electrical signaling and processing are one technique for signal transmission and processing. Optical signaling and processing have been used in increasingly more applications in recent years, due to the use of optical fiber-related applications for signal transmission.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
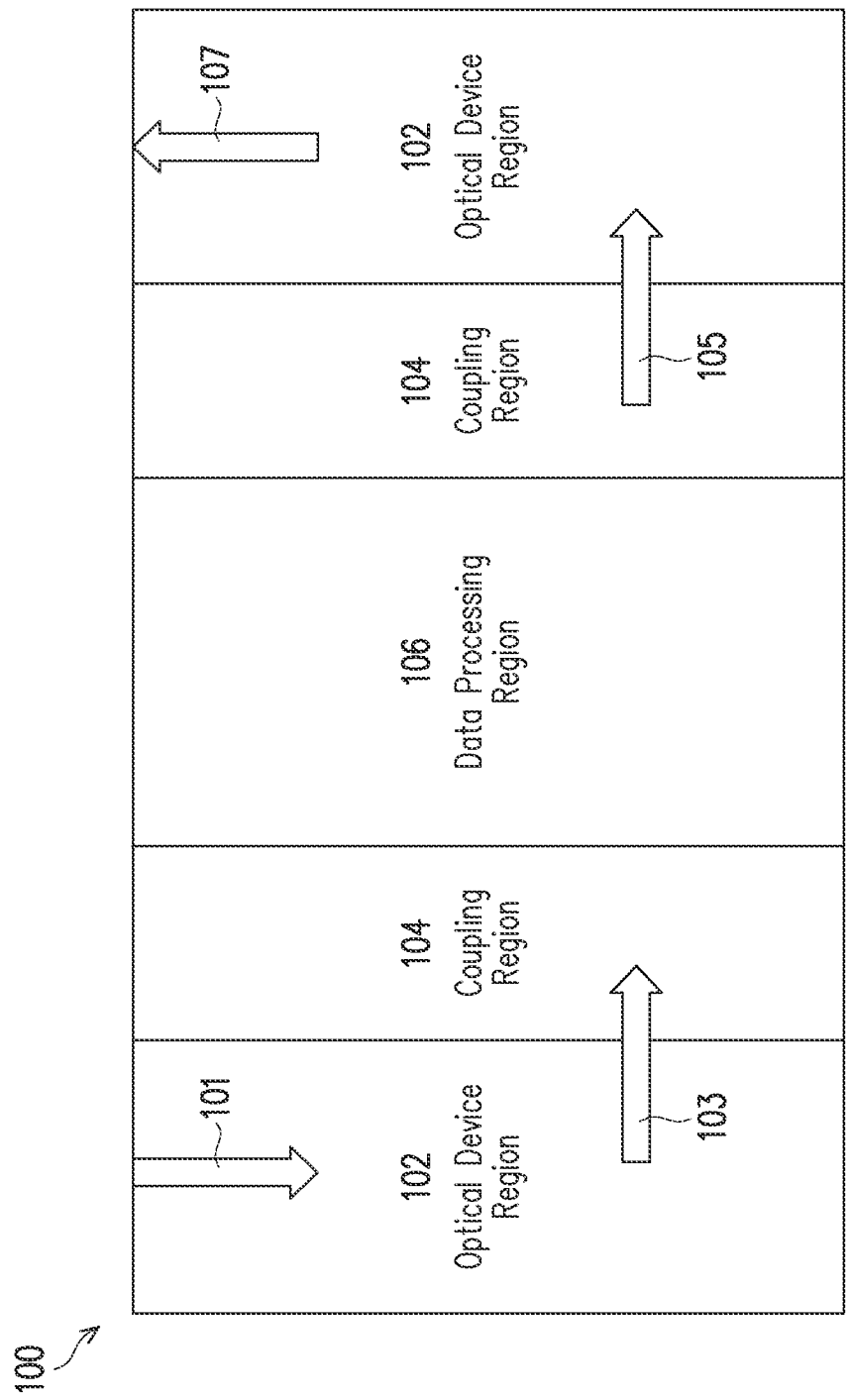
FIG. 1 illustrates an example arrangement of components of a photonic neural network system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include a number of optical (or photonic) dies each having various optical devices, and a number of electronic dies each having various electronic devices. The present disclosure provides multi-layers of SiN to perform photonic neural network operation. In some embodiments, the high speed conversion between optical signals and electrical signals can be realized on a silicon-on-insulator (SOI) layer.

Electronic neural network has been intensively investigated for artificial intelligence, big data, and machine learning applications. However, speed of the electronic neural network may be bottlenecked by data exchanging speed among computing blocks, communications with memory, and clock rate of CMOS logic circuit. Photonic integrated circuit provides potential solutions to the above problems. The basic linear multiply-accumulate (MAC) operation can be achieved by different photonic links at the speed of light.

In some embodiments, photonic neural network (PNN) research may be based on silicon-on-insulator (SOI) platform. For a single-layer PNN, photonic devices (e.g., modulators, MAC units, and photodetectors) may be fabricated on the same crystal-Si layer. The fabrication of single-layer PNN is inefficient, expensive, computation density limited, and power hungry. Hence, the present disclosure initiates multiple photonic neural network layers to solve/address such problems. The systems and methods presented herein include novel approaches for linear photonic processing.

A photonic neural network (PNN) system may include a number of optical interconnect structures. The optical interconnect structure may be configured to transmit/receive an optical signal (e.g., light), and direct or otherwise guide the optical signal via optical waveguides from/to one or more optical devices (e.g., modulators and photodetectors). In some scenarios, these optical waveguides may be formed in a single level. In consideration of saving a total area occupied by the corresponding photonic die, such optical waveguides may be formed (e.g., stacked) across multiple levels. When being stacked, each of the waveguides typically has a certain portion vertically overlapped with (a portion) of a neighboring waveguide. Each of the waveguides may be formed as having a transitioning portion interposed between two tapered portions to optically communicate with each other and assure the optical signal propagated therein can be saturated.

The present disclosure provides various embodiments of a system including a number of photonic neural network layers operatively (e.g., optically) coupled to each other, and the method of forming the same. In accordance with various embodiments, the system (or each of its included photonic neural network layers), as disclosed herein, includes a number of waveguides vertically stacked on top of one another and at least some of these waveguides each essentially consist of a first tapered portion and a second tapered portion back-to-back connected to each other. For example, the plurality of first waveguides and the plurality of second waveguides each have a tapered end. Adjacent ones of the plurality of first waveguides have their respective tapered ends vertically overlapped with each other, and adjacent ones of the plurality of second waveguides have their respective tapered ends vertically overlapped with each other. In this way, a total footprint of each of the photonic neural network layers can be significantly reduced. The waveguides can each have a certain portion laterally overlapped with (a portion of) a neighboring waveguide, which allows the waveguides disposed in different levels or in different dies (chips) to optically communicate with each other.

FIG. 1 illustrates a photonic neural network system 100, in accordance with various embodiments. The photonic neural network system 100 may include an optical device region 102, an optical coupling region 104, and a data processing region 106 (e.g., neural network region). The optical device region 102 can transmit, receive, convert, modulate, demodulate, or otherwise process optical signals. For example, the optical device region 112 can convert electrical signals (e.g., 101) from a processor die to optical signals (e.g., 103), and convert optical signals (e.g., 105) to electrical signals (e.g., 107). The optical device region 102 is responsible for the input/output (I/O) of electrical signals (e.g., 101 and 107) to/from a processor die. In some embodiments, the optical device region 102 that converts an electrical signal (e.g., 101) to an optical signal (e.g., 103) for processing may be referred to as an input region, and the optical device region 102 that coverts the processed optical signal to an electrical signal (e.g., 107) may be referred to as an output region.

The optical coupling region 104 may include adiabatic light transition, in which light energy is transitioned between different layers of waveguides. The optical coupling region 104 may encode input optical signals into an array of optical signals for data processing. In various embodiments, the neighboring one of waveguides may be laterally arranged in a certain configuration, thereby allowing respective modes of optical signals propagated in these neighboring waveguides to spatially match in order to obtain a desired amount of efficient optical coupling. The term " "waveguides" can include any structure that can guide optical signals in a confined manner. According to various embodiments, the waveguides of each photonic neural network layer can include an input waveguide, a number of intermediate waveguides, and an output waveguide.

The optical coupling region 104 may be interconnected by an optical pathway, which allows separate computing systems to communicate with each other. For example, the optical coupling region 104 may be a closed loop (or ring) that connects to each photonic neural network layer of the photonic neural network system 100. As such each photonic neural network layer may communicate with any of the other photonic neural network layer via the optical coupling region 104. In an embodiment, the optical coupling region 104 includes a plurality of waveguides, and each waveguide connects at least two of the photonic neural network layers in a peer-to-peer manner.

The data processing region 106 may include multiple layers of neural networks to perform a linear transformation of the array of optical signals. The linear transformation may include multiply—accumulate operation (MAC). For example, the array of optical signals is treated as a vector. The multiple layers of neural networks may perform optical interference to multiply the vector. The multiplication may generate optical signals to send to a next optical unit. In some embodiments, multiple layers of linear operation can be distributed in different layers and accomplished in one round of processing.

A photonic neural network may include an input layer, at least one hidden layer, and an output layer. In each layer, information may propagate through the neural network via linear combination (e.g. matrix multiplication) followed by a nonlinear activation function applied to the result of the linear combination. In training an artificial neural network model, data can be fed into the input layer, and the output is calculated through the forward propagation step. Then the parameters can be optimized through the back propagation procedure. The weighting parameters of each synapse (i.e., matrix entry) can be optimized through the back propagation procedure.

Figure 2:
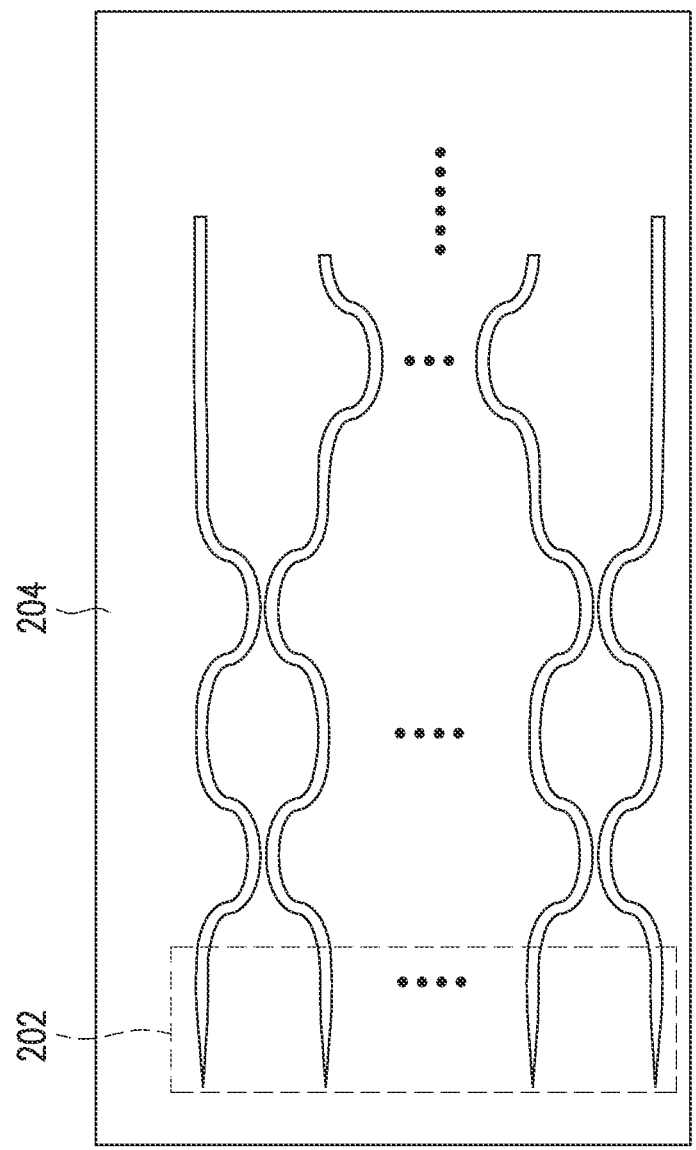
FIG. 2 illustrates a top view of the photonic neural network system of FIG. 1, in accordance with some embodiments.

FIG. 2 illustrates a top view of one example layer of the photonic neural network system of FIG. 1, in accordance with some embodiments. In some embodiments, a photonic neural network can be fabricated on any of Si layers or SiN layers. The photonic neural network can be tuned by metal heaters or other structures that can tune refractive index of waveguides. Each layer of photonic neural network may include a layer-layer coupling region 202 and an optical interference region 204. The layer-layer coupling region 202 of FIG. 2 is an implementation of the optical coupling region 104 of FIG. 1. The layer-layer coupling region can transfer optical signals/powers between Si layers and SiN layers, among Si layers, or among SiN layers by evanescent coupling structures. The optical signals/powers transfer can be realized at the edge or in the middle of the photonic neural network. In some embodiments, the coupling structures can be taper structures. The optical interference region 204 of FIG. 2 is an implementation of the data processing region 106 of FIG. 1. The optical interference region 204 can be configured to perform a linear transformation or a nonlinear activation function by optical interferences units. The optical interference region 204 may connect each input waveguide to each and all of output waveguides.

Figure 3:
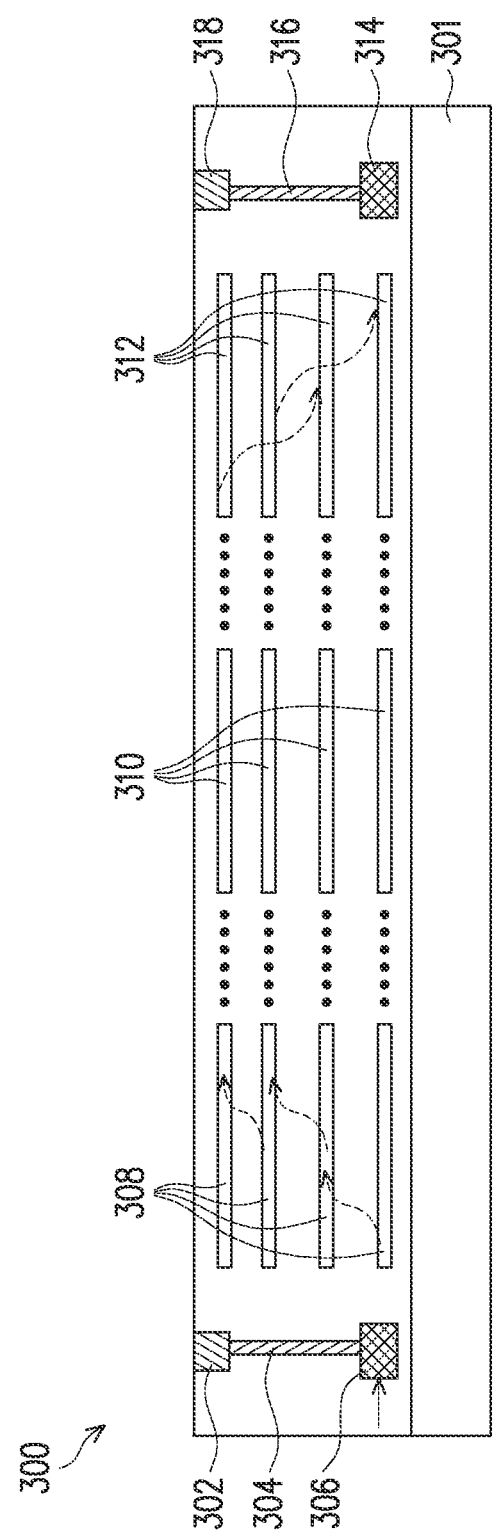
FIG. 3 illustrates a first example cross-sectional view of a portion of the photonic neural network system of FIG. 1, in accordance with some embodiments.

FIG. 3 illustrates an example cross-sectional view of a portion of the photonic neural network system of FIG. 1, in accordance with some embodiments. For example, the photonic neural network system 300 may include a first metal contact 302, a first metal via 304, a modulator 306, a number of first optical coupling waveguides 308, a number of optical interference waveguides 310, a number of second optical coupling waveguides 312, a photodetector 314, a second metal via 316, and a second metal contact 318. In some embodiments, the photonic neural network system 300 can be fabricated on a silicon on insulator (SOI) layer 301. The SOI layer 301 may be used for active devices (e.g., modulators, monitors, or photodetectors). The cross-sectional view of the photonic neural network system 300, in FIG. 3, is simplified as a schematic diagram, while another example of the photonic neural network system 400 will be shown and discussed in the cross-sectional view of FIG. 4. Further, it should be appreciated that over the SOI layer 301, the photonic neural network system can include any of various other optical receivers/transmitters attached thereto, for example, one or more modulators 306, one or more photodetectors 314, etc., while remaining within the scope of present disclosure.

The first optical coupling waveguides 308, the optical interference waveguides 310, and the second optical coupling waveguides 312 shown in FIG. 3 are provided for illustration purposes, and thus, it should be appreciated that each of the photonic neural network system, as disclosed herein, can include any number (e.g., from 1 to about 1000) of the waveguides stacked in any of various other arrangements, while remaining within the scope of present disclosure. As shown, the waveguides are vertically stacked on top of one another. Further, at least each of the waveguides is formed in a tapered end profile, with no straight portion interposed between two tapered portion connected back-to-back.

In some embodiments, the first optical coupling waveguides 308, the second optical coupling waveguides 312, and the optical interference waveguides 310 can be formed of SiN layers. Each SiN layer can be one layer of photonic neural network. Multiple SiN layers can be used to parallel process input optical signals. These photonic neural network layers can optically communicate with each other through their respective input and output waveguides. In the present example of FIG. 3, the input waveguide may be disposed as a leftmost group of the waveguides and the output waveguide may be disposed as a rightmost group of the waveguides, with the intermediate waveguides interposed therebetween.

Optical signal/power can be realized at the edge or in the middle of the photonic neural network layers. Each photonic neural network layer can be folded, by utilizing the optical coupling waveguides 308, 312, to shrink a size of a chip. For example, depending on the total number of photonic neural network layers (e.g., SiN layers), the chip size can be reduced by ~40% for 2 layers of SiN; ~60% for 3 layers of SiN; ~70% for 4 layers of SiN. The low loss property of SiN routing structures can make SiN suitable for photonic quantum computing applications.

In some embodiments, a metal contact 302 may receive an electrical signal from an electrical die. The electrical signal may be transmitted to a modulator 306 though a first metal via 304. The metal contact 302, the modulator 306, and the first metal via 304 of FIG. 3 are implementations of the optical device region 102 of FIG. 1. The first metal via 304 may extend through a plurality of insulator layers and electrically couple to the modulator 306. The modulator 306 may receive a first array of optical signals and manipulate properties (e.g., optical power or phase) of the first array of optical signals according to the electrical signal from the electrical die. The first array of optical signals may be transmitted to the first optical coupling waveguides 308 (e.g., intermediate waveguides). The first optical coupling waveguides 308 of FIG. 3 is an implementation of the coupling region 104 of FIG. 1. The first array of optical signals may communicate between different photonic neural network layers (e.g., the first optical coupling waveguides) through taper structures. A number of optical interference waveguides 310 can include an array of waveguides to receive the first array of optical signals and interference the received optical signals with each other. The optical interference waveguides 310 of FIG. 3 is an implementation of the data processing region 106 of FIG. 1. The optical interference waveguides 310 may perform linear (e.g., matrix multiplication) and/or non-linear (e.g., activation function) transformations.

The optical interference waveguides 310 may collectively function as one of a plurality of layers (e.g., an input layer, multiple hidden layers, or an output layer) of an artificial neural network. An artificial neural network in general may include an input layer, at least one hidden layer, and an output layer. In each layer, information (e.g., optical signals) may propagate through the neural network via linear combination (e.g. matrix multiplication) followed by a nonlinear activation function applied to the result of the linear combination. In training an artificial neural network model, data (e.g., optical signals) can be fed into the input layer, and the output is calculated through the forward propagation step.

After the linear and/or non-linear transformations, the first array of optical signals may be configured to a second array of optical signals. The second array of optical signals may communicate to a number of second optical coupling waveguides 312. The second optical waveguides 312 of FIG. 3 is an implementation of the coupling region 104 of FIG. 1. The second array of optical signals may communicate between different photonic neural network layers through taper structures in the second optical coupling waveguides 312.

A photodetector 314 may be employed in the photonic neural network system to detect the second array of optical signals and convert the second array of output optical signals back to a large number of parallel output electrical signals. The parallel output electrical signals may be transmitted to a second metal contact 318 through a second metal via 316. The photodetector 314, the second metal via 316, and the second metal contact 318 of FIG. 3 are implementations of the optical device region 102 of FIG. 1. The second metal via 316 may extend through a plurality of insulator layers and electrically couple to the photodetector 314.

Figure 4:
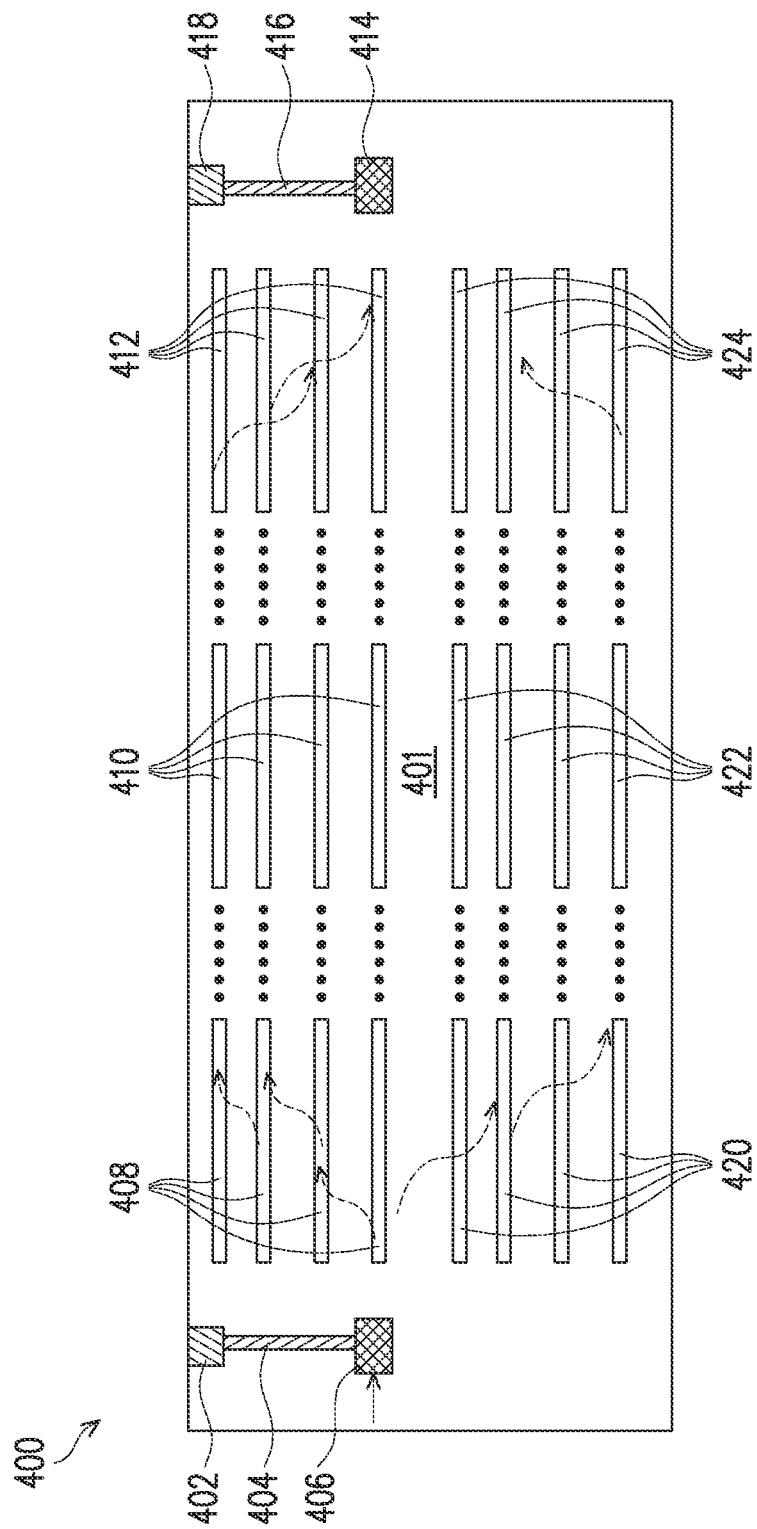
FIG. 4 illustrates a second example cross-sectional view of a portion of the photonic neural network system of FIG. 1, in accordance with some embodiments.

FIG. 4 illustrates a second example cross-sectional view of a portion of the photonic neural network system of FIG. 1, in accordance with some embodiments. FIG. 4 basically includes the same elements as FIG. 3. For example, the photonic neural network system 400 may include a first metal contact 402, a first metal via 404, a modulator 406, a number of first optical coupling waveguides 408, a number of optical first interference waveguides 410, a number of second optical coupling waveguides 412, a photodetector 414, a second metal via 416, a second metal contact 418, a number of third optical coupling waveguides 420, a number of second interference waveguides 422, and a number of fourth optical coupling waveguides 424. In some embodiments, a SOI layer 401 has a first side and a second side opposite to each other. The first optical coupling waveguides 408, the first optical interference waveguides 410, and the second optical coupling waveguides 412 are formed on the first side of the SOI layer 401. In some embodiments, the modulator 406 and the photodetector 414 are formed on the first side of the SOI layer 401. The first metal contact 402, the first metal via 404, the modulation 406, the photodetector 414, the second metal via 416, and the second metal contact 418 of FIG. 4 are implementations of the optical device region 102 of FIG. 1. In FIG. 4, the main different is that the third optical coupling waveguides 420, the second optical interference waveguides 422, and the fourth optical coupling waveguides 424 are formed on the second side of the SOI layer 401. The first optical coupling waveguides 408 and the third optical coupling waveguides 420 of FIG. 4 are implementations of the coupling region 104 of FIG. 1. The second optical coupling waveguides 412 and the fourth optical coupling waveguides 424 of FIG. 4 are implementations of the coupling region 104 of FIG. 1. The first optical interference waveguides 410 and the second optical interference waveguides 422 of FIG. 4 are implementations of the data processing region 106 of FIG. 1. The number of optical coupling waveguides 408, second optical coupling waveguides 412, third optical coupling waveguides 420, fourth optical coupling waveguides 424, optical first interference waveguides 410, and second interference waveguides 422 are collectively configured for implementing an artificial neural network.

The first optical interference waveguides 410 and the second interference waveguides 422 may collectively function as one of a plurality of layers (e.g., an input layer, multiple hidden layers, or an output layer) of an artificial neural network. An artificial neural network may include an input layer, at least one hidden layer, and an output layer. In each layer, information (e.g., optical signals) may propagate through the neural network via linear combination (e.g. matrix multiplication) followed by a nonlinear activation function applied to the result of the linear combination. In training an artificial neural network model, data (e.g., optical signals) can be fed into the input layer, and the output is calculated through the forward propagation step.

In some embodiments, each photonic neural network layer can be folded, by utilizing the optical coupling waveguides 408, 412, 420, 424, to shrink a size of a chip. For example, depending on the total number of photonic neural network layers (e.g., SiN layers), the chip size can be reduced by ~40% for 2 layers of SiN; ~60% for 3 layers of SiN; ~70% for 4 layers of SiN. In some embodiments, photonic elements can be placed on different layers of SiN, which is equivalent to making it possible to fold photonic circuits to save the chip area. With multiple layers of SiN, multiple layers of linear operation can be distributed in different layers and accomplished in one round of processing.

Figure 5A:
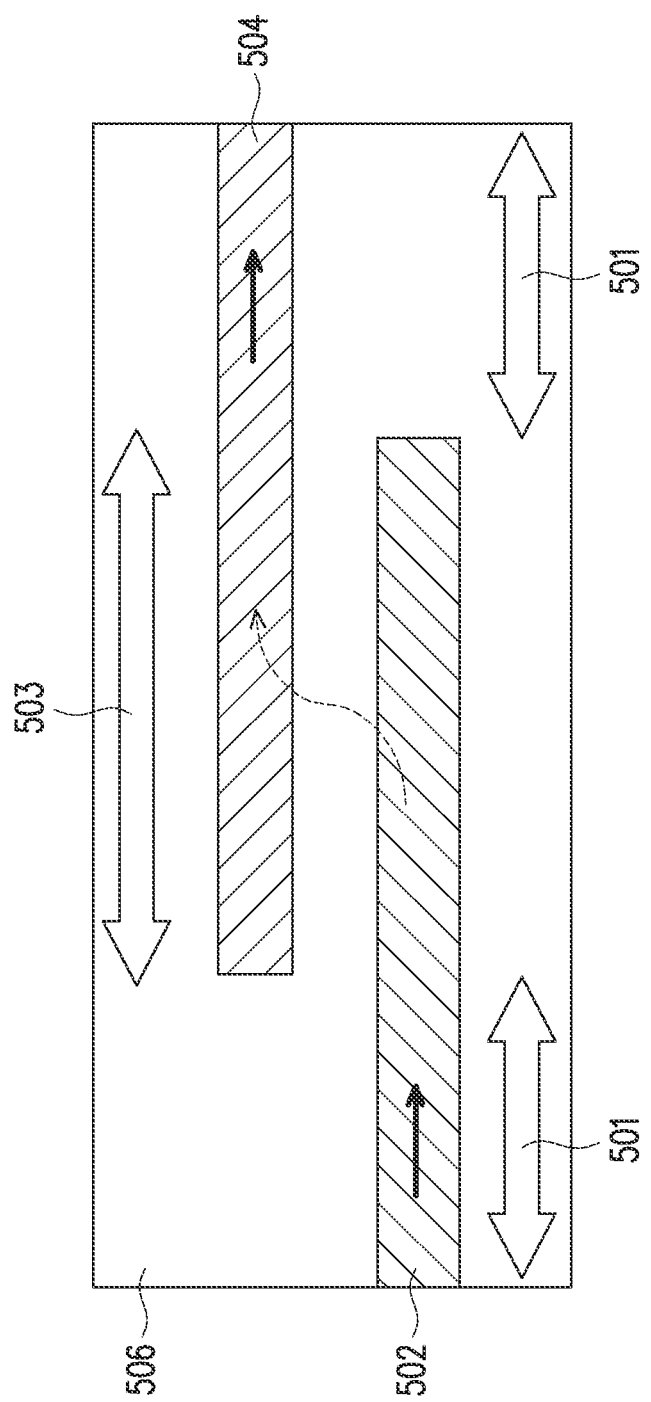
FIG. 5A illustrates a cross-sectional view of two waveguides, in accordance with some embodiments.
Figure 5B:
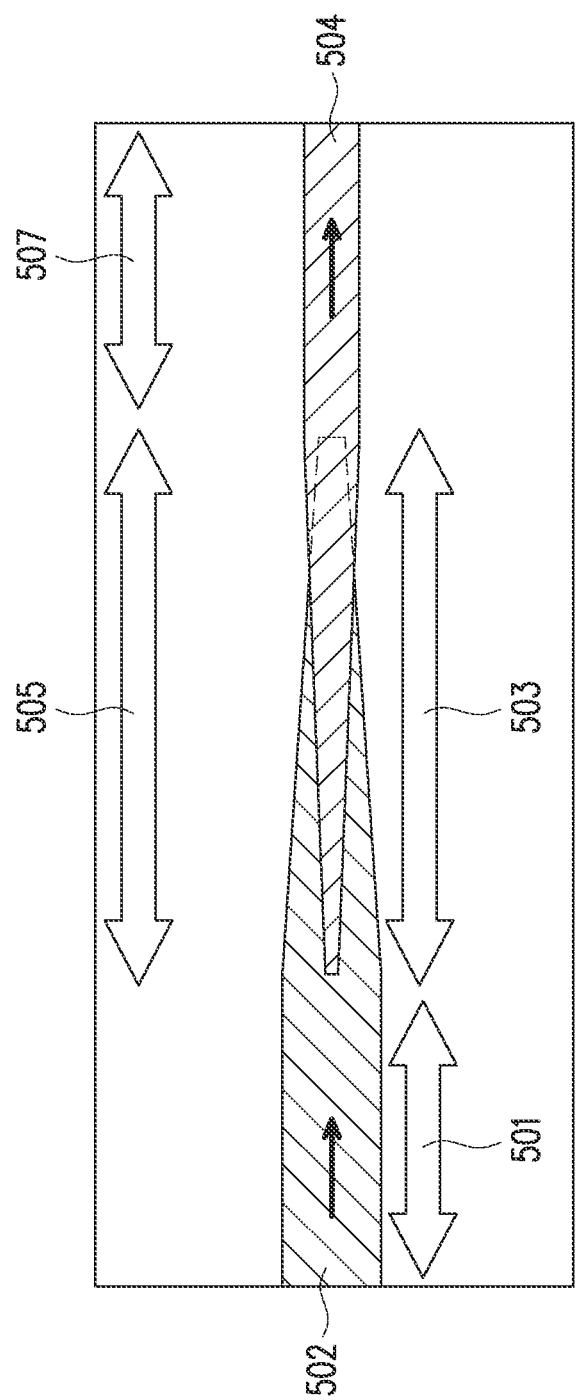
FIG. 5B illustrates a corresponding top view of the two waveguides in FIG. 5A, in accordance with some embodiments.

FIG. 5A illustrates a cross-sectional view of at least some of the waveguides 308, 312, 408, 412, 420, and 424 (FIGS. 3 and 4), and FIG. 5B illustrates a corresponding top view of these waveguides, in accordance with various embodiments. The two waveguides shown in FIGS. 5A-5B are provided for illustration purposes, and thus, it should be appreciated that each of the photonic neural network system, as disclosed herein, can include any number (e.g., from 1 to about 1000) of the waveguides stacked in any of various other arrangements, while remaining within the scope of present disclosure.

As shown in FIG. 5A, a second waveguide 504 is vertically stacked on a first waveguide 502. Specifically, the first waveguide 502 and the second waveguide 504 are disposed in respective different layers of a dielectric material 506. For example, the first waveguide 502 is disposed in a first layer and the second waveguide 504 is disposed in a second layer. Furthermore, the first waveguide 502 has a certain portion laterally overlapped with respective portions of the second waveguide 504. Alternatively stated, the second waveguide 504 may be laterally shifted from the first waveguide 502 (also shown in FIG. 5B), with an offset distance. Such an offset distance can be adjusted to optimize performance of the waveguides, which will be discussed in further detail below.

In various embodiments, the first waveguide 502, disposed in the bottom layer, may be referred to as an input waveguide, and the second waveguide 504, disposed in the top layer, may be referred to as an output waveguide. In some embodiments, there may be a number of waveguides, which may sometimes be referred to as intermediate waveguides, interposed between the input and output waveguides. In some embodiments, the first waveguide 502 and the second waveguide 504 may have the same thickness or respectively different thicknesses (t), and the first waveguide 502 and the second waveguide 504 may be vertically spaced apart with a vertical distance (g). As a non-limiting example, t is in the range from about 100 nanometer (nm) to about 1000 micrometer (μm), and g is in the range from 100 nm to about 10 The first waveguide 502 can receive an input optical signals 501 (e.g., from a fiber through a grating coupler) and transmit (or otherwise optically couple) the optical signal 501 to the upper waveguides via optical paths 503. For example, such an optical coupling may include adiabatic light transition, in which light energy is transitioned between different layers of waveguides. The second waveguide 504, upon receiving the optical signals 501 transmitted from the first waveguide 502, can output the optical signals 501 (e.g., to a data processing region).

Referring next to the top view of FIG. 5B, each of the input/output waveguides (e.g., 502 and 504) has an input/output tapered portion overlapped at least with one neighboring waveguide, in accordance with various embodiments. The first waveguide 502 has a straight portion 501 and a tapered portion 503. The straight portion 501 may laterally extend over a certain length and have a fixed width prior to connecting to the tapered portion 503. The tapered portion 503 may laterally extend over a length and have a decreasing width. In some embodiments, the width may monotonically decrease from a connection point between the portions 501 and 503 (i.e., the fixed width) to an end of the first waveguide 502. Inverse taper structures can be used to transfer optical power/signals between different layers. Typically, 100% power transfer can be easily realized by the taper structure. Power tap or any desired power ratio can also be realized by a properly design of the tapers.

In the next upper layer (level), the second waveguide 504 has a tapered portion 505 and a straight portion 507. The tapered portion 505 may laterally extend over a length and have an increasing width prior to connecting to the straight portion 507. The straight portion 507 may laterally extend over a certain length and have a fixed width. In some embodiments, the width may monotonically increase from an end of the second waveguide 504 to a connection point between the portions 505 and 507 (i.e., the fixed width). The first waveguide 502 disposed immediately lower than the second waveguide 504 (while having a certain portion vertically overlaid by the second waveguide 504) may be laterally shifted from the second waveguide 504 with a lateral distance. Such an offset may be defined as a distance laterally respective first ends of an intermediate waveguide and the second 504, in some embodiments. In various embodiments, the neighboring one of intermediate waveguides may be laterally arranged in a certain configuration, thereby allowing respective modes of optical signals propagated in these neighboring waveguides to spatially match in order to obtain a desired amount of efficient optical coupling.

In various embodiments, the offsets may each be configured with a non-zero value to achieve the spatially matched modes, while not overly expanding the footprint of the first waveguide 502 and the second waveguide 504. Generally, with a presence of the non-zero offset, the transmission portion (e.g., the portion having a decreasing width) of the first (e.g., lower) waveguide 502 can be better aligned with the reception portion (e.g., the portion having an increasing width) of the second (e.g., upper) waveguide 504. In some implementations, each of the offsets between adjacent intermediate waveguides may be configured with a range greater than zero and not less than one half of the length of a corresponding overlaid intermediate waveguide. In some implementations, each of the offsets between adjacent intermediate waveguide and input/output waveguide may be configured with a range greater than zero and not less than one half of the length of the tapered portion of the corresponding input/output waveguide.

In some embodiments, widths of the tapered portions 503, 504 can be varied in the range from about 1 nm to about 10 μm, depending on a wavelength of the optical signal propagated therein. As a non-limiting example, for a single mode of the optical signal in the wavelength of 1310 nm or 1550 nm, the width can vary from about 0.5 μm to about 1.5 μm. In some embodiments, lengths of the tapered portions 503, 504 can be varied in the range from about 1 μm to about 1 centimeters (cm). In some other embodiments, each of the waveguides can have any of other various profiles, as long as the neighboring waveguides respectively have a desired number of modes matched to each other. For example, the transmission portion (e.g., the portion having a decreasing width) of a first (e.g., lower) waveguide is aligned with the reception portion (e.g., the portion having an increasing width) of a second (e.g., upper) waveguide. The present disclosure enhances photonic power efficiency by reducing the propagation loss.

FIGS. 6A-6H are schematic cross-sectional views of an example photonic neural network system during various fabrication stages, in accordance with some embodiments. FIG. 7 is a flowchart of an exemplary method for fabricating a photonic neural network system. It is understood that FIGS. 6A-6H and FIG. 7 have been simplified for a better understanding of the concepts of the present disclosure. Accordingly, it should be noted that additional processes may be provided before, during, and after the methods of FIGS. 7 and 6A-6H, and that some other processes may only be briefly described herein.

Referring now to FIGS. 6A-6H in conjunction with FIG. 7, a photonic neural network system 600 can be fabricated in accordance with the method 700 of FIG. 7. It should be noted that the method 700 is merely an example, and is not intended to limit the present disclosure. Accordingly, it is understood that the order of operation of the method 700 of FIG. 7 can change, that additional operations may be provided before, during, and after the method 700 of FIG. 7, and that some other operations may only be described briefly herein.

Figure 6A:
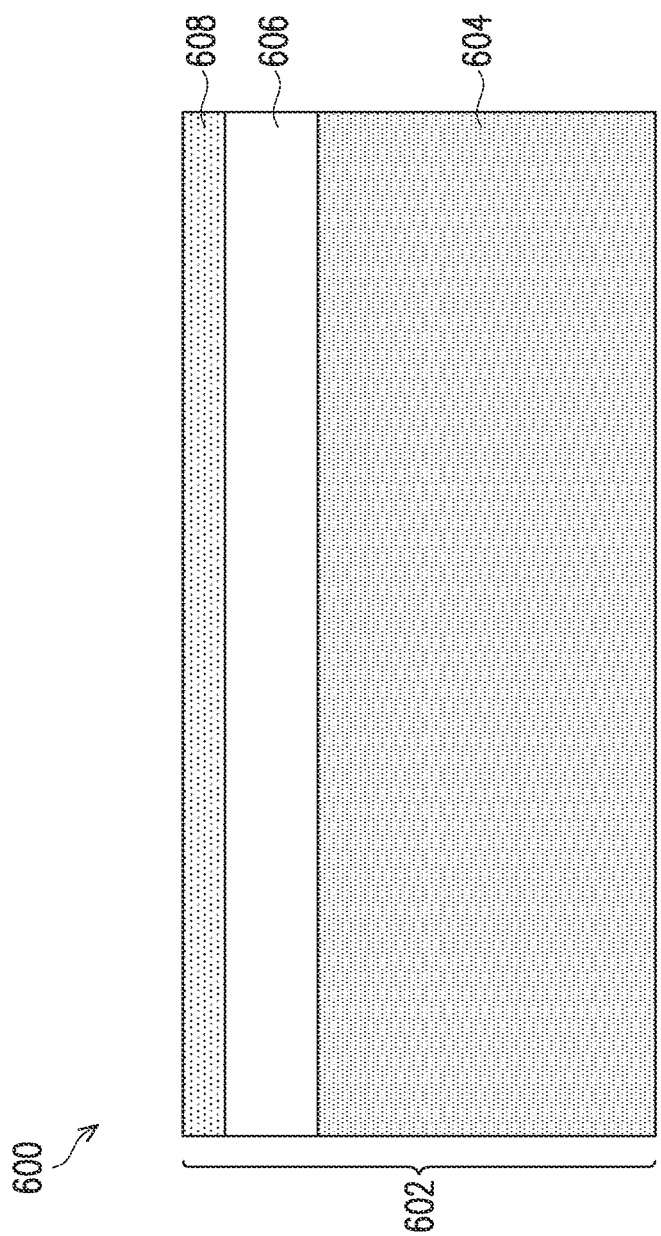
FIGS. 6A-6H illustrate cross-sectional views of an example photonic neural network system during various fabrication stages, in accordance with some embodiments.
Figure 7:
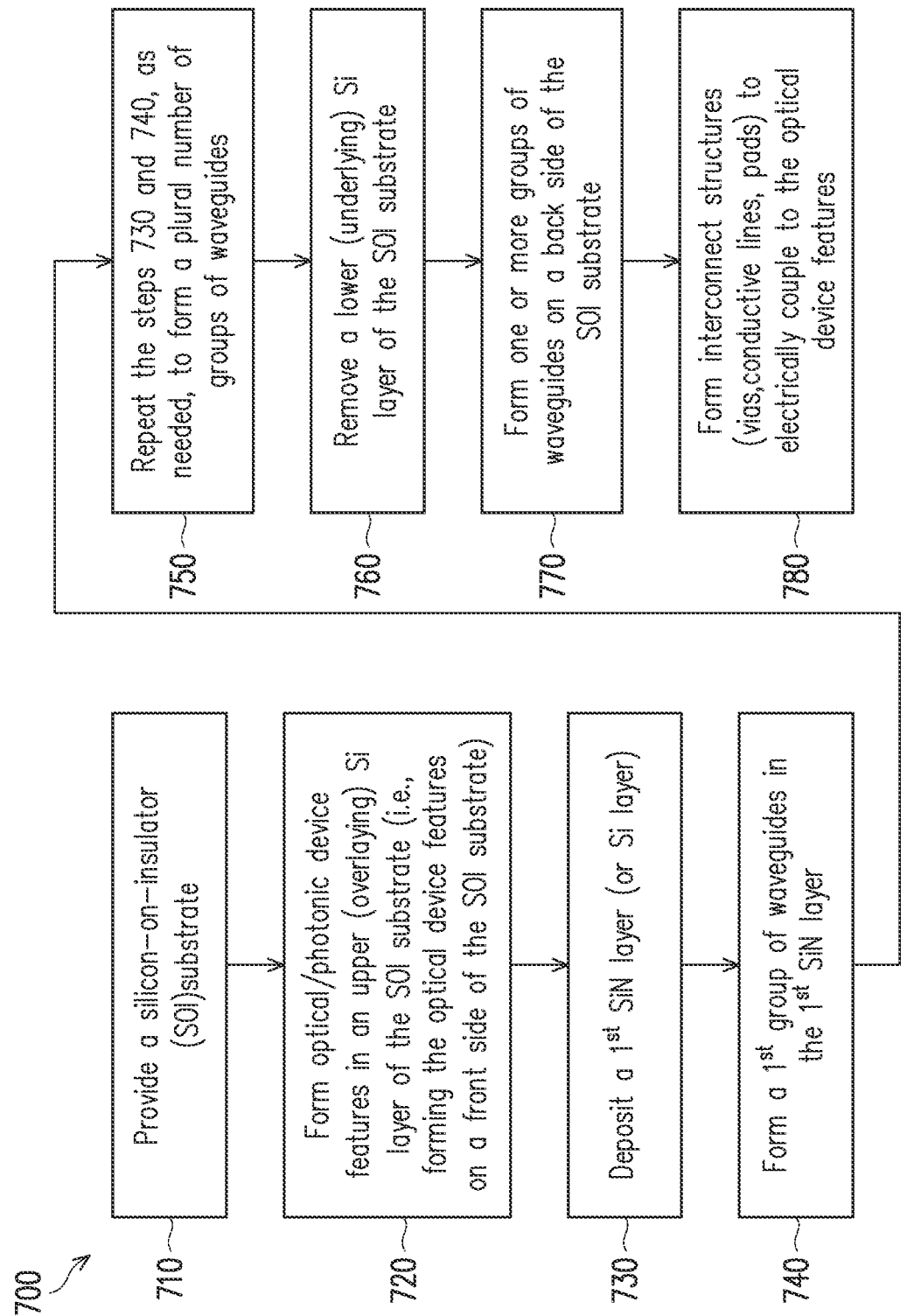
FIG. 7 is an example flow chart of a method for fabricating a photonic neural network system, in accordance with some embodiments.

As shown in FIGS. 6A and 7, operation 710 can provide a silicon-on-insulator (SOI) substrate 602. In some embodiments, the SOI substrate 602 may include three-layered wafers made of a Si substrate 604, an insulator layer 606 (or buried oxide (BOS) layer), and an upper Si layer 608 (e.g., device layer). The insulator layer may be, for example, a BOX layer, a silicon oxide layer, or the like. The insulator layer is provided on a semiconductor material, typically a silicon or glass substrate.

Figure 6B:
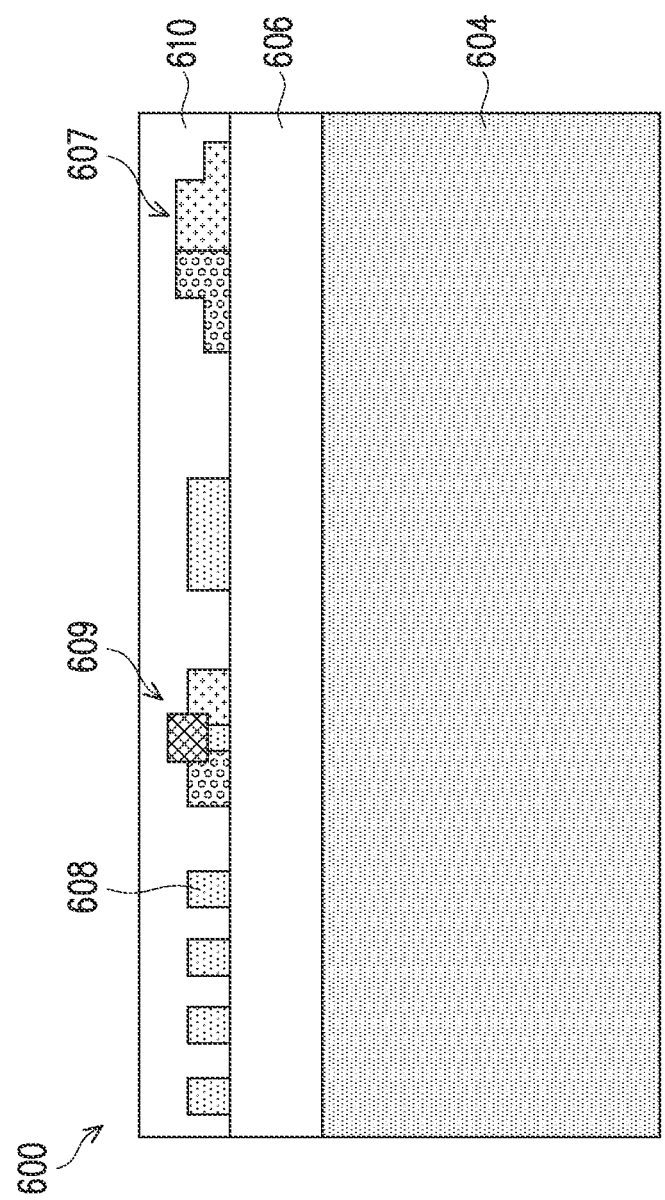

In some embodiments, operation 720 can include forming a plurality of optical/photonic device features 607, 609 in an upper (overlaying) Si layer 608 of the SOI substrate 602 (i.e., forming the optical device features on a front side of the SOI substrate) as shown in FIG. 6B. In some embodiments, the optical/photonic device features may include modulators, monitors, or photodetectors. A dielectric material 610 (e.g., silicon dioxide spacer layer) can be formed over the optical/photonic device features 607, 609. The dielectric material 610 may be formed of silicon oxide, silicon nitride, a high-k dielectric material, a combination thereof, or the like, and may be formed by chemical vapor deposition (CVD), physical vapor deposition (PVD), atomic layer deposition (ALD), a spin-on-dielectric process, the like, or a combination thereof. After formation, the dielectric material 610 may be planarized, such as by a chemical mechanical polish (CMP) or a mechanical grinding, to avoid transfer of the pattern of the optical/photonic device features 607, 609 to the dielectric material 610. In an embodiment, the dielectric material 610 is an oxide, such as silicon oxide. Due to the difference in refractive indices of the materials of the optical/photonic device features 607, 609 and the dielectric material 610, the optical/photonic device features 607, 609 has high internal reflections such that light is confined in the optical/photonic device features 607, 609, depending on the wavelength of the light and the reflective indices of the respective materials. In an embodiment, the refractive index of the material of the optical/photonic device features 607, 609 is higher than the refractive index of the material of the dielectric material 610.

In some embodiments, the dielectric material 610 having a certain dielectric material may be "locally" formed over previous dielectric material. For example, in an area where there is no conductive features are formed, a first portion of the dielectric material 610, having a high-k dielectric material, can be formed in this area, while a second portion of the dielectric material 610, having a dielectric material other than the high-k dielectric material, can be formed in an area where the conductive features 609, 607 are formed. In some embodiments, the dielectric material 610, having a common dielectric material (e.g., silicon nitride), may be "globally" formed over the previous dielectric material. The dielectric material 610 may be formed as a number of layers (or levels), each of which corresponds to one of the metallization layers having conductive features and each of which can include a number of the disclosed waveguides that has a tapered end profile (when viewed from the top).

Figure 6C:
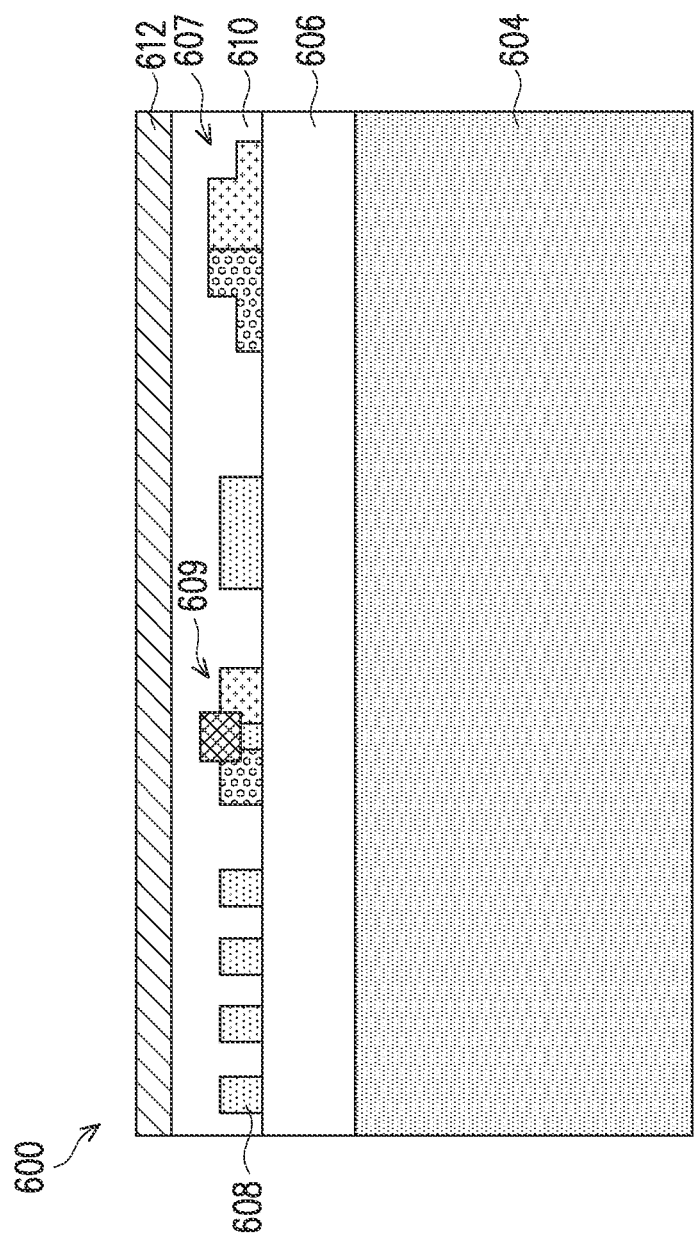

Referring to FIG. 6C and operation 730, a first waveguide material layer 612 may be deposited over top of the optical/photonic device features 607, followed by an annealing process. In some embodiments, the first waveguide material layer 612 may be formed of silicon, silicon nitride, a combination thereof, or the like, and may be formed by chemical vapor deposition (CVD), physical vapor deposition (PVD), atomic layer deposition (ALD), a spin-on-dielectric process, the like, or a combination thereof. After formation, the first waveguide material layer 612 may be planarized, such as by a chemical mechanical polish (CMP) or a mechanical grinding.

The first waveguide material layer 612 is then patterned using photolithography techniques, and etched using plasma etch processes. Patterning the overlaying semiconductor material may be accomplished with acceptable photolithography and etching techniques. In particular, openings are etched in the overlaying semiconductor material, and remaining portions of the overlaying semiconductor material can form the first group of waveguides. The BOX layer 606 may act as an etch stop layer for the etching process.

Figure 6D:
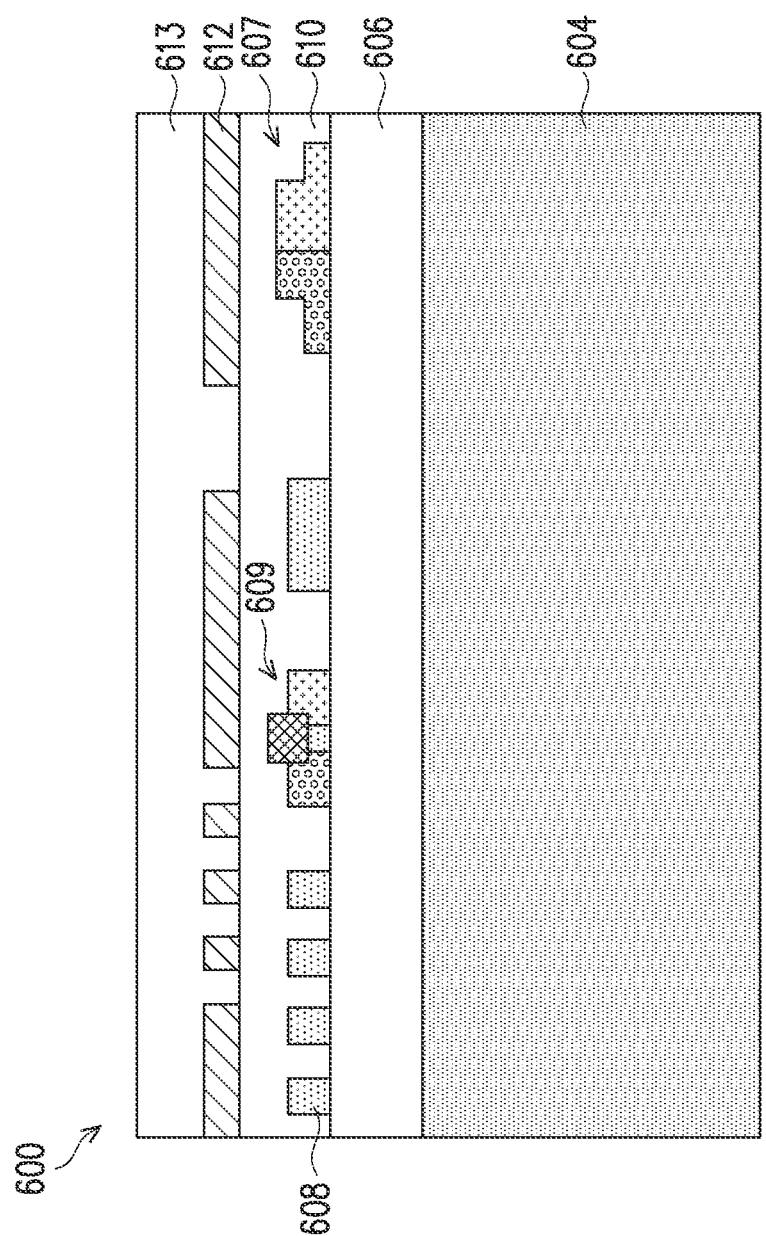

The first group of waveguides is then formed in the first waveguide material layer 612, as shown in FIG. 6D and operation 740. In some embodiments, the first group of waveguides can be formed by forming a patterned photoresist (not shown) exposing regions that are to be removed. An etch process (e.g., a reactive ion etch (RIE) process) can remove the exposed regions of etch-stop layer and the first waveguide material layer 612. The etching processes may be an anisotropic wet or dry etch. After forming the first group of waveguides, the patterned photoresist can be removed. The first group of waveguides can be collectively configured for implementing an artificial neural network.

A dielectric material 613 may be formed on the pattern of the first group of waveguides 612. In an embodiment, the dielectric material 613 is an oxide, such as silicon oxide. Due to the difference in refractive indices of the materials of the waveguide 612 and the dielectric material 613, the waveguide 612 has high internal reflections such that light is confined in the waveguide 612, depending on the wavelength of the light and the reflective indices of the respective materials. In an embodiment, the refractive index of the material of the waveguide 612 is higher than the refractive index of the material of the dielectric material 613.

Figure 6E:
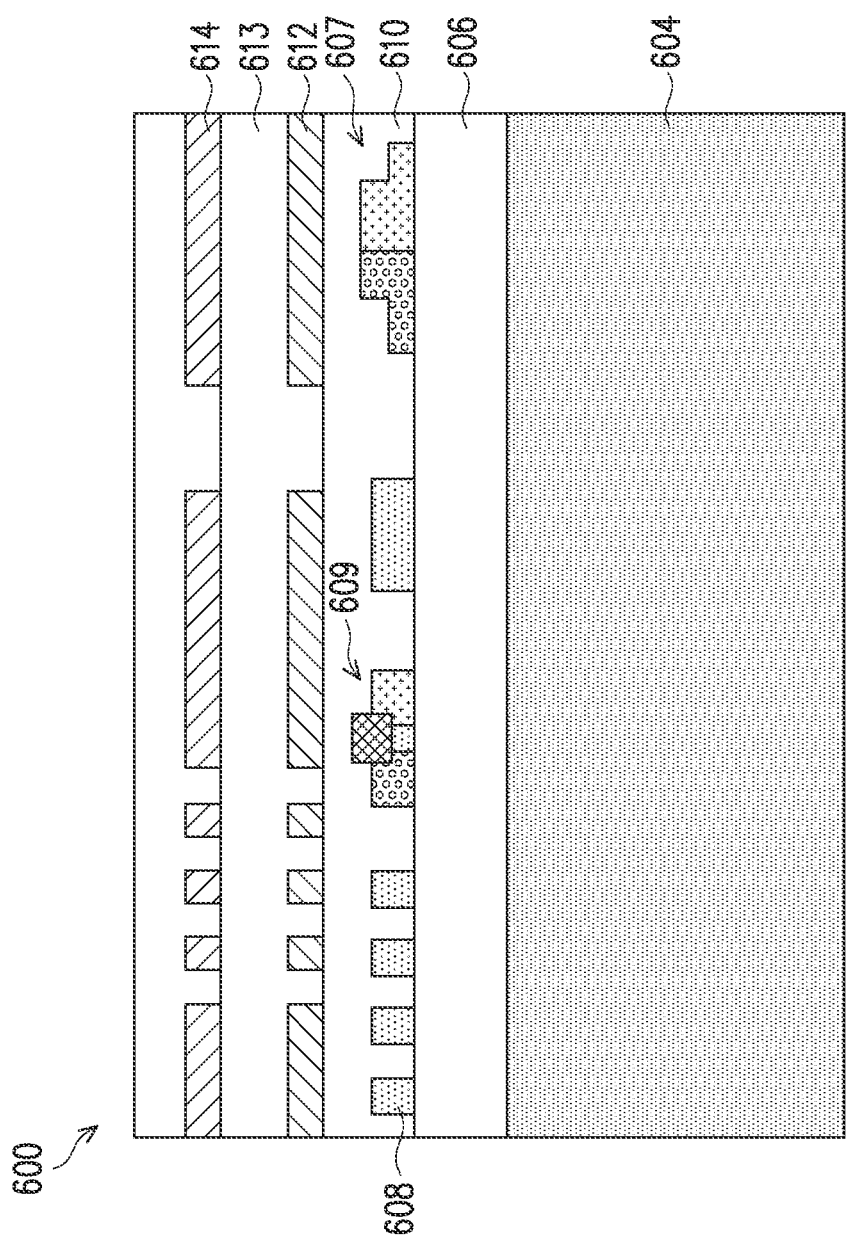
Figure 6F:
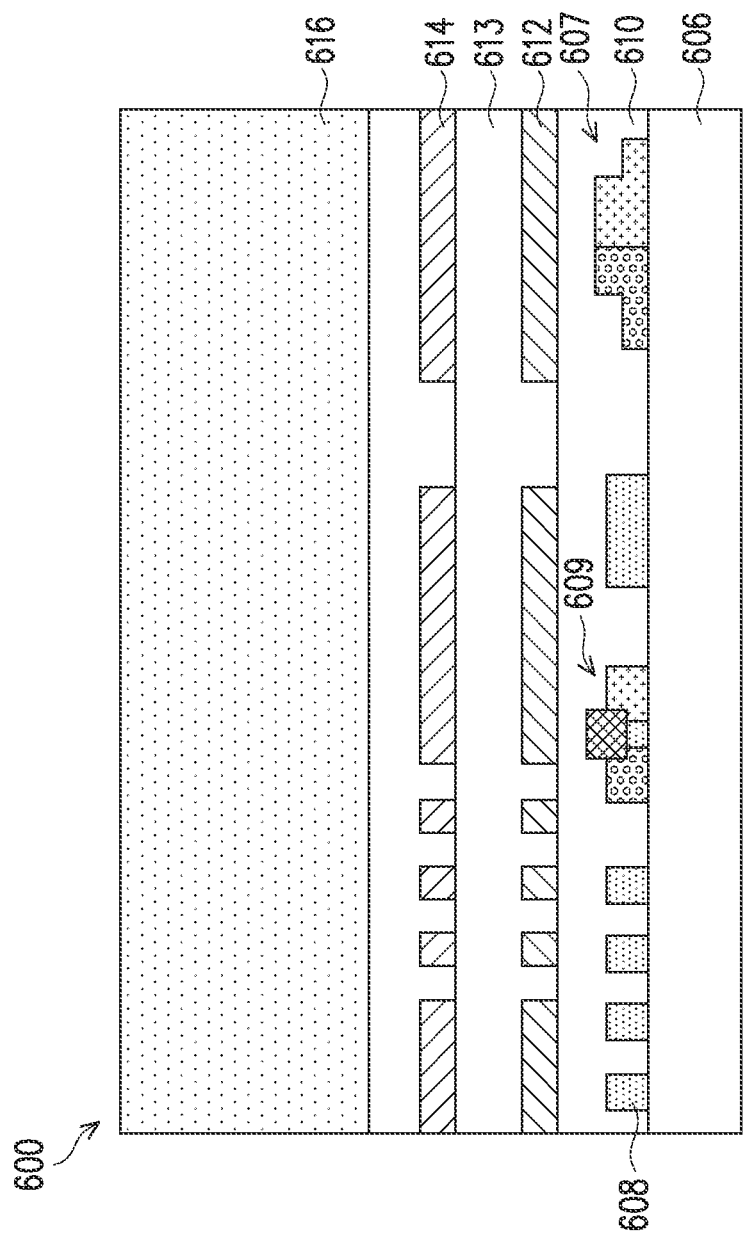

In some embodiments, operations 730 and 740 can be repeated as needed to form a plural number of groups of waveguides 612, 614, as shown in FIG. 6E. For example, following the deposition of a respective layer of the dielectric material 613 (as a blanket layer), the layer can be patterned through acceptable photolithography and etching techniques to form the waveguides 614, followed by refilling another dielectric material as a spacer for the waveguides. In some embodiments, an interconnect structure (not shown) can be formed over the optical/photonic device features 607, 609 for electrical connection (e.g., operation 770).

In some embodiments, a handling wafer 616 may be attached to the top of the first group of waveguides. In the following step, the Si substrate 604 (e.g., the lower (underlying) Si layer of the SOI substrate 602) can be removed with operation 750. With the Si substrate 604 removed, the waveguide structures can be patterned on both sides of the SOI, which can further increase the integration density.

Figure 6G:
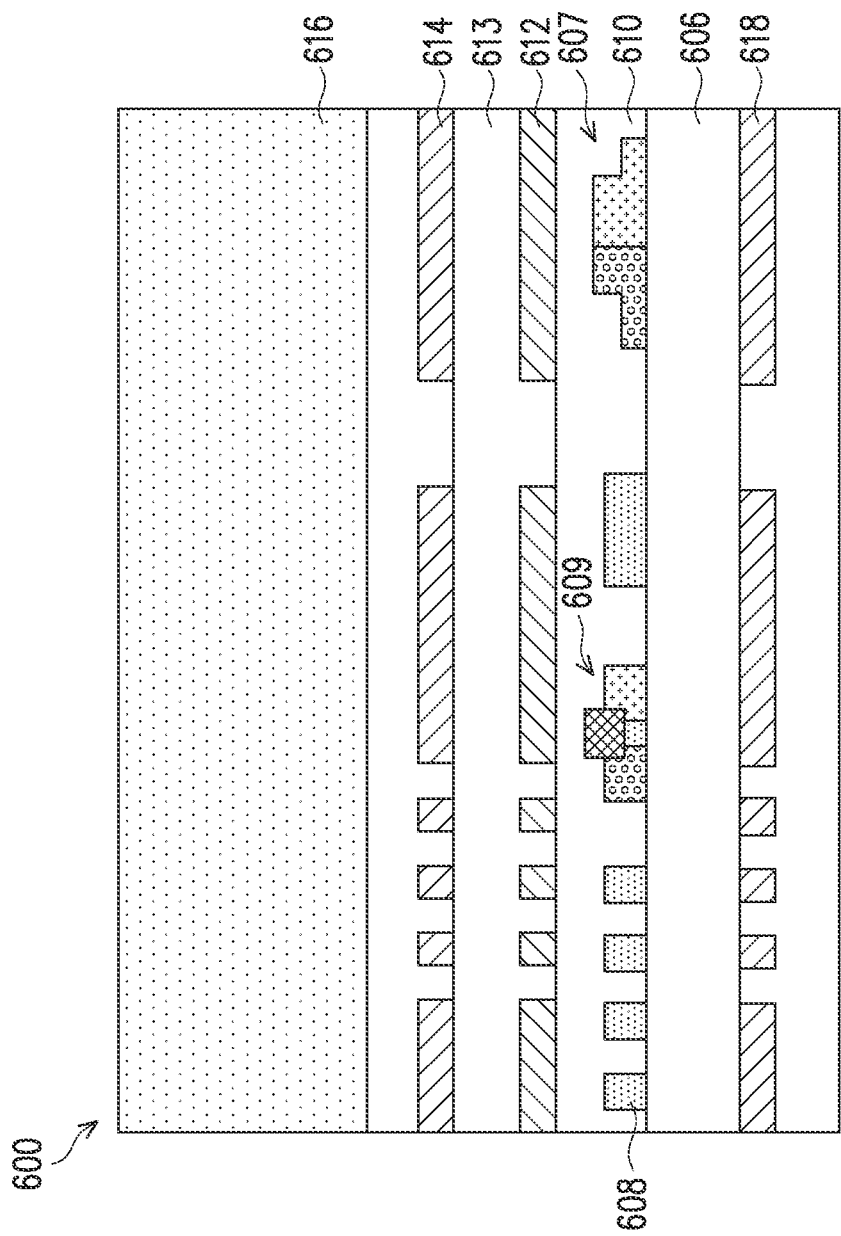

Referring to FIG. 6G and operation 760, a dielectric layer (e.g., silicon dioxide spacer layer) can be formed on the opposite side of the optical/photonic device features 607, 609. A plurality of second waveguide material layer 618 may be deposited on the dielectric layer (e.g., the opposite side of the optical/photonic device features 607, 609) followed by an annealing process. In some embodiments, the second waveguide material layer 618 may include silicon nitride, silicon, or combination thereof. The second waveguide material layer 618 is then repeated the deposition and/or patterning processes in operation 740 (e.g., patterned using photolithography techniques, etched using plasma etch processes) to form a second group of waveguides. The second group of waveguides can be collectively configured for implementing an artificial neural network.

Figure 6H:
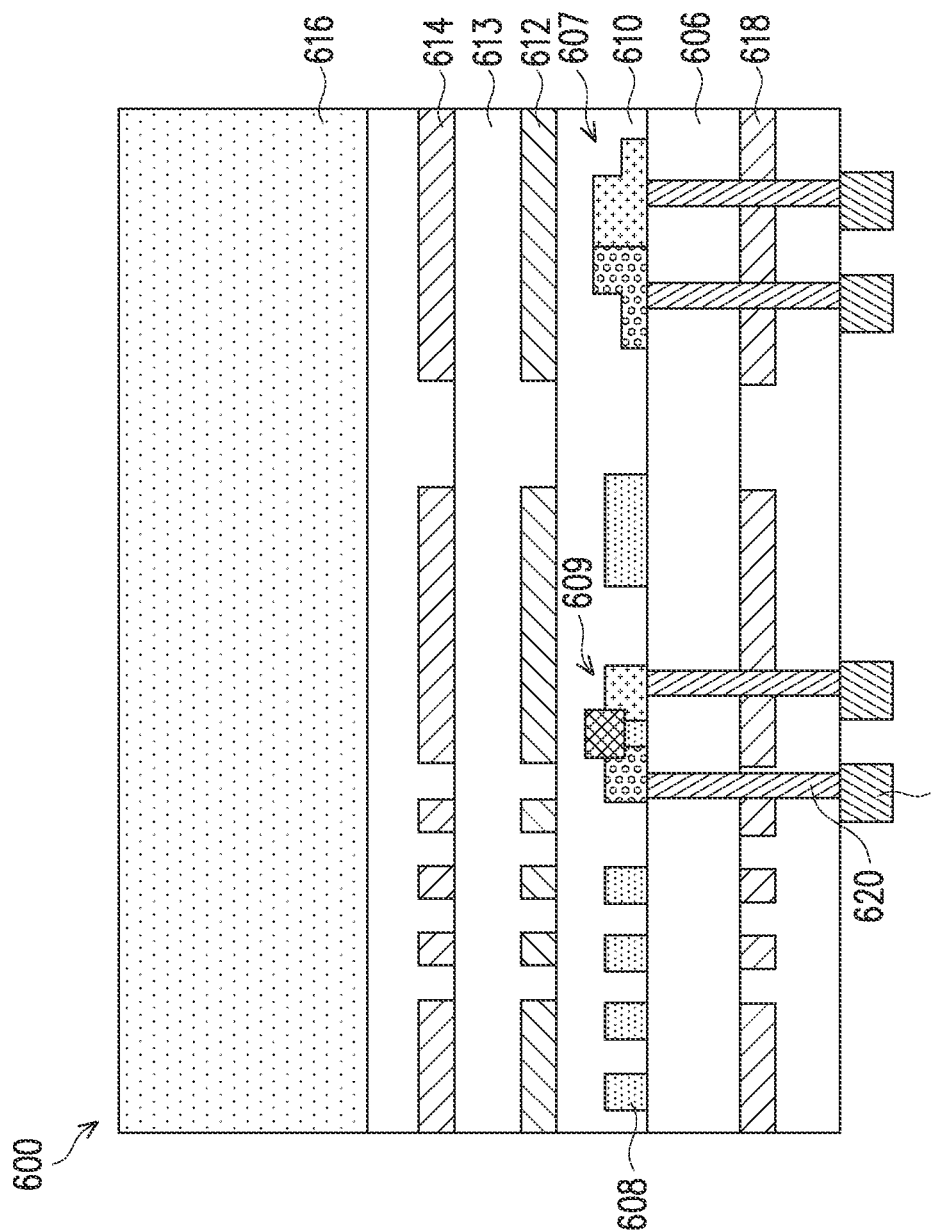

Referring to FIG. 6H and operation 770, an interconnect structure 620 can be formed over the optical/photonic device features 607, 609 for electrical connection. Although the interconnect structure 620 are formed over the optical/photonic device features 607, 609 (when the workpiece is flipped), which is sometimes referred to as a backside of the substrate 604, it should be understood that various other interconnect structures (similar to the interconnect structure 620) can be formed on a frontside of the substrate 604, while remaining within the scope of the present disclosure.

The interconnect structure 620 may include lines and vias, and may be formed by a damascene process, e.g., dual damascene, single damascene, or the like. The interconnect structure 620 may be disposed in a number of layers or levels, sometimes referred to as metallization layers. Generally, the metallization layers disposed closet to and farthest from the optical/photonic device features 607, 609 may be referred to as M0 (the bottommost metallization layer) and Mx (the topmost metallization layer), respectively. Over the Mx, a number of pads (not shown) may be formed to electrically connect the interconnect structure 620 therein to a metal contact structure 622 of the photonic neural network system 600. In some embodiments, the interconnect structure 620 can include a plurality of interconnection layers (not shown) spaced by a plurality of isolation layers. The interconnection layers can have a material such as copper, aluminum, tungsten, titanium, tantalum, other conductive material, and/or combinations thereof. The isolation layers can include a material such as oxide, nitride, oxynitride, low dielectric constant (low-k) dielectric, ultra-low-k dielectric, other dielectric, and/or combinations. In some embodiments, a metal contact structure 622 can be formed over the interconnect structure 620 and bonded to an electrical die (not shown). In some embodiments, the metal contact structure 622 can include a material such as a lead-free alloy (such as gold (Au) or a tin/silver/copper (Sn/Ag/Cu) alloy), a lead-containing alloy (such as a lead/tin (Pb/Sn) alloy), copper, aluminum, aluminum copper, other bump metal material, and/or combinations thereof. A planarization process, such as a CMP or mechanical grinding may be performed to remove excess conductive material along a surface of underlying semiconductor material. In various embodiments, the interconnect structure 620 can electrically couple the contact structure 622, which are electrically coupled to an electrical die. The present disclosure provides flexible process flow and low fabrication cost.

In one aspect of the present disclosure, a semiconductor device is disclosed. The semiconductor device may include an oxide layer having a first side and a second side opposite to each other. The semiconductor device may include a plurality of first waveguides that can be disposed across a plurality of first insulator layers, respectively, on the first side of the oxide layer. The semiconductor device may include a plurality of second waveguides that can be disposed across a plurality of second insulator layers, respectively, on the second side of the oxide layer. The plurality of first waveguides and the plurality of second waveguides collectively form a plurality of photonic neural network layers of an artificial neural network.

In another aspect of the present disclosure, an apparatus for implementing an artificial neural network is disclosed. The apparatus may include an input region configured to receive a first optical signal. The apparatus may include a neural network region optically coupled to the input region and configured to transform the first optical signal to a second optical signal. The apparatus may include an output region optically coupled to the neural network region and configured to convert the second optical signal into a first electrical signal. The neural network region may include a plurality of waveguides that can be disposed across a plurality of vertically stacked insulator layers, respectively.

In yet another aspect of the present disclosure, a method for making semiconductor devices is disclosed. The method may include forming a plurality of optical devices in an overlaying silicon layer disposed on a first side of a silicon-on-insulator (SOI) substrate. The method may include forming, over the plurality of optical devices, a plurality of first waveguides disposed across a plurality of first insulator layers, respectively. The method may include forming, over a second side of the SOI substrate opposite to the first side, a plurality of second waveguides disposed across a plurality of second insulator layers, respectively. The plurality of first waveguides and the plurality of second waveguides collectively form a plurality of photonic neural network layers of an artificial neural network.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
   an oxide layer having a first side and a second side opposite to each other;
   an input optical device formed on the first side of the oxide layer;
   an output optical device also formed on the first side of the oxide layer;
   a plurality of first waveguides that are disposed across a plurality of first insulator layers, respectively, on the first side of the oxide layer; and
   a plurality of second waveguides that are disposed across a plurality of second insulator layers, respectively, on the second side of the oxide layer;
   wherein the plurality of first waveguides and the plurality of second waveguides collectively form a plurality of photonic neural network layers of an artificial neural network.

2. The semiconductor device of claim 1, wherein the plurality of first waveguides and the plurality of second waveguides are each formed of silicon nitride.

3. The semiconductor device of claim 1, wherein the plurality of first waveguides and the plurality of second waveguides are each formed of silicon.

4. The semiconductor device of claim 1, further comprising:
   a first interconnect structure extending through the plurality of first insulator layers and electrically coupled to the input optical device; and
   a second interconnect structure extending through the plurality of first insulator layers and electrically coupled to the output optical device.

5. The semiconductor device of claim 1, wherein the input optical device is configured to receive a first array of optical signals, at least some of the plurality of first waveguides and the plurality of second waveguides are configured to perform a liner transformation and then a nonlinear transformation on the first array of optical signals into a second array of optical signals, and the output optical device is configured to convert the second array of optical signals into a plurality of electrical signals.

6. The semiconductor device of claim 1, wherein the input optical device and the output optical device are both formed below a bottommost one of the plurality of first insulator layers.

7. The semiconductor device of claim 1, wherein the plurality of first waveguides and the plurality of second waveguides each have a tapered end, when viewed from the top.

8. The semiconductor device of claim 7, wherein adjacent ones of the plurality of first waveguides have their respective tapered ends vertically overlapped with each other, and adjacent ones of the plurality of second waveguides have their respective tapered ends vertically overlapped with each other.

9. The semiconductor device of claim 1, wherein a respective subset of the plurality of first waveguides disposed in each of the plurality of first insulator layers collectively function as a first one of the plurality of photonic neural network layers, and a respective subset of the plurality of second waveguides disposed in each of the plurality of second insulator layers collectively function as a second one of the plurality of photonic neural network layers.

10. An apparatus for implementing an artificial neural network, comprising:
    an input region configured to receive a first optical signal;
    a neural network region optically coupled to the input region and configured to transform the first optical signal to a second optical signal; and
    an output region optically coupled to the neural network region and configured to convert the second optical signal into a first electrical signal;
    wherein the neural network region comprises a plurality of waveguides that are disposed across a plurality of vertically stacked insulator layers, respectively.

11. The apparatus of claim 10, wherein the input region includes at least one modulator configured to modulate the first optical signal based on a second electrical signal received through a first via structure.

12. The apparatus of claim 10, wherein the input region includes at least one photodetector configured to output the first electrical signal through a second via structure.

13. The apparatus of claim 10, wherein the plurality of waveguides are each formed of silicon nitride.

14. The apparatus of claim 10, wherein the plurality of waveguides are each formed of silicon.

15. The apparatus of claim 10, wherein the plurality of insulator layers are each formed of silicon dioxide.

16. The apparatus of claim 10, wherein the plurality of waveguides collectively form at least one of a sequence of layers of an artificial neural network.

17. A method for making semiconductor devices, comprising:
    forming a plurality of optical devices in an overlaying silicon layer disposed on a first side of a silicon-on-insulator (SOI) substrate;
    forming, over the plurality of optical devices, a plurality of first waveguides disposed across a plurality of first insulator layers, respectively;
    attaching a carrier substrate to the SOI substrate with the plurality of first waveguides interposed therebetween;
    flipping the SOI substrate;
    removing an underlying silicon layer disposed on the second side of the SOI substrate to forming the plurality of second waveguides;
    forming, over a second side of the SOI substrate opposite to the first side, a plurality of second waveguides disposed across a plurality of second insulator layers, respectively; and
    forming a plurality of interconnect structures electrically coupled to the plurality of optical devices, respectively;
    wherein the plurality of first waveguides and the plurality of second waveguides collectively form a plurality of photonic neural network layers of an artificial neural network.

18. The method of claim 17, wherein the plurality of first waveguides and the plurality of second waveguides are each formed of silicon nitride, silicon, or combinations thereof.

19. The method of claim 17, wherein the plurality of first waveguides are each formed of silicon nitride.

20. The method of claim 17, wherein the plurality of first waveguides are each formed of silicon.

\* \* \* \* \*